United States Patent [19]

Asano

[11] 4,409,937

[45] Oct. 18, 1983

[54] SPARK TIMING CONTROL DEVICE FOR AN INTERNAL COMBUSTION ENGINE

[75] Inventor: Masaharu Asano, Yokosuka, Japan

[73] Assignee: Nissan Motor Company, Ltd., Yokohama, Japan

[21] Appl. No.: 159,439

[22] Filed: Jun. 13, 1980

[30] Foreign Application Priority Data

Jan. 1, 1979 [JP] Japan .................. 54-140416
Jun. 15, 1979 [JP] Japan .................. 54-75425
Jun. 15, 1979 [JP] Japan .................. 54-75426

[51] Int. Cl.³ .............................................. F02P 5/04
[52] U.S. Cl. .................................... 123/425; 73/35; 123/427
[58] Field of Search .................. 123/425, 427; 73/35

[56] References Cited

U.S. PATENT DOCUMENTS

| | | | |
|---|---|---|---|
| 4,002,155 | 1/1977 | Harned et al. | 123/425 |
| 4,012,942 | 5/1977 | Harned | 73/35 |
| 4,106,447 | 8/1978 | West | 123/425 |
| 4,111,035 | 9/1978 | West et al. | 73/35 |
| 4,133,475 | 10/1978 | Harned et al. | 73/35 X |
| 4,153,020 | 5/1979 | King et al. | 123/425 |
| 4,268,910 | 5/1981 | Omori et al. | 123/425 X |
| 4,271,799 | 6/1981 | Kato et al. | 123/425 |
| 4,279,143 | 7/1981 | Guipaud | 123/425 X |
| 4,285,315 | 8/1981 | Douaud et al. | 123/425 |
| 4,319,480 | 3/1982 | Yamaguchi et al. | 73/35 |
| 4,343,278 | 8/1982 | Asano | 123/425 |
| 4,344,400 | 8/1972 | Asano | 123/425 |

FOREIGN PATENT DOCUMENTS

| | | |
|---|---|---|
| 2337261 | 7/1977 | France . |
| 2398895 | 2/1979 | France . |
| 1529364 | 10/1978 | United Kingdom . |
| 2021690 | 12/1979 | United Kingdom . |
| 2022828 | 12/1979 | United Kingdom . |
| 2024317 | 1/1980 | United Kingdom . |
| 1563361 | 3/1980 | United Kingdom . |
| 2056560 | 3/1981 | United Kingdom .......... 123/425 |

*Primary Examiner*—Tony M. Argenbright
*Attorney, Agent, or Firm*—Schwartz, Jeffery, Schwaab, Mack, Blumenthal & Koch

[57] ABSTRACT

A first circuit is provided for producing an output which changes at a certain rate by an amount corresponding to a predetermined crank angle in the direction of retarding a spark timing each time a knocking determination signal, representing that knocking occurs, is inputted thereto with a frequency higher than a predetermined frequency and an amplitude larger than a predetermined amplitude. The output from the first circuit further changes at a smaller rate than said certain rate in the direction of advancing the spark timing in the absence of the knocking determination signal. A second circuit is provided for outputting a waveform which is reset each time a spark command signal is inputted thereto and which thereafter changes to a predetermined level at a rate depending upon the rotational speed of the engine. A third circuit is provided for comparing the outputs of the first and second circuits to output a pulse signal of a duration depending upon the level of the output of the first circuit. A fourth circuit means is provided for retarding the spark timing by an amount corresponding to the duration of the pulse signal.

18 Claims, 20 Drawing Figures

(2400 rpm)

(1200 rpm)

SPARK TIMING CONTROL DEVICE FOR AN INTERNAL COMBUSTION ENGINE

BACKGROUND OF THE INVENTION

1. Field of the Invention

The present invention relates to an internal combustion engine, and more particularly to a spark timing control device for an internal combustion engine.

2. Description of the Prior Art

Conventionally, in the design of an internal combustion engine mounted on an automotive vehicle, various considerations have been made from the standpoint of improving the performance of the engine. For example, in setting the spark timing, a manifold vacuum advance angle mechanism or a centrifugal advance angle mechanism has been adopted so as to obtain an optimal fuel consumption and a maximum output: a spark timing at a point very close to so-called M.B.T. (Minimum advance for Best Torque). On the other hand, in the relatively low speed range of a conventional spark ignition internal combustion engine, the critical spark time point beyond which knocking occurs and which depends on the kind of the engine and the octane number of the fuel used is on the side retarded from M.B.T., and therefore knocking may occur if the spark time point is set at M.B.T. Thus, in order to set the spark time point as close as possible to M.B.T. within the scope in which no knocking occurs, and in a relatively low speed region of crankshaft rotation, it is most recommendable to set the spark time point at the critical spark time point. However, there are, in fact, the influences of the engine aging and inhomogeneities in the fuel octane number which affect operation, and therefore it is inevitable that the spark time point will be set on the side further retarded from the critical spark time point, thereby increasing the fuel consumption and lowering the power output. The fuel consumption increase and power output decrease are especially large in an engine which is supercharged or has a high compression ratio, both of which characteristics have recently been considered as a means for decreasing the fuel consumption and increasing the power output, which is a big problem with these engines.

Although the spark time point may be set with some leeway on the side retarded from the critical spark time point, there is a possibility of knocking occurring depending on the driving conditions of an automotive vehicle, the operating condition of the engine, and the environmental conditions. It has been impossible to avoid knocking completely under any conditions.

On the other hand, if the spark time point is set so retarded as to prevent any knocking, the fuel consumption will be greatly increased and the power output will be greatly lowered, thereby bringing about no practical advantage.

Thus, conventionally, the spark timing has been controlled by a manifold vacuum advance angle mechanism or a centrifugal advance angle mechanism which have conventional or slightly advanced spark timing characteristics. Only when knocking actually occurs, the spark timing has been slightly retarded in order to avoid further knocking, as disclosed in U.S. Pat. No. 4,002,155.

A spark timing control device of this type starts to operate by detecting knocking occurring in the engine. A system for detecting this knocking according to the U.S. Patent mentioned above counts the number of portions of a signal containing knocking frequency components from an engine vibration sensor which exceed a reference level, and determines knocking according to the number of counted portions. Therefore, this determination is liable to be affected by noise, so that the signal containing knocking frequency components must be compared with another higher reference level in order to positively determine knocking. Thus the device cannot avoid use of complicated structure and often fails to operate reliably.

Such a spark timing control device carries out sampling for each predetermined period to determine the presence of knocking, retards the spark timing by a predetermined angle each time knocking occurs, and advances the spark timing by another amount when no knocking occurs. However, according to this structure, the control of retarding and advancing the spark timing by a predetermined amount is not carried out until completing the sampling. Therefore, the control response is slow. Further, since the angle by which the ignition is retarded is constant and independent of the frequency of the knocking, this retarded angle does not necessarily correspond to the required amount, and a retarded angle which eliminates the knocking is not obtained unless a considerable number of samplings are carried out, thereby not avoiding undesirable response.

SUMMARY OF THE INVENTION

A spark timing control device for an internal combustion engine, according to the present invention, comprises: producing means for producing an output which changes at a certain rate by an amount corresponding to a predetermined crank angle in the direction of retarding a spark timing each time a knocking determination signal, representing that knocking occurs, is inputted thereto with a frequency higher than a predetermined frequency and an amplitude larger than a predetermined amplitude, and which changes at a smaller rate than said certain rate in the direction of advancing the spark timing in the absence of the knocking determination signal.

Outputting means is provided for outputting a waveform which is reset each time a spark command signal is inputted thereto and which thereafter changes to a predetermined level at a rate depending upon the rotational speed of the engine.

First comparator means is provided for comparing the outputs of the producing means and the outputting means to output a pulse signal of a duration depending upon the level of the output of the producing means.

Retarding means is provided for retarding the spark timing by an amount corresponding to the duration of the pulse signal.

Alternatively, the producing means may output a signal which, in the absence of the knocking determination signal, changes by an amount corresponding to a predetermined crank angle in the direction of advancing the spark timing each time the spark command signal changes in a predetermined direction, and then holds the final value until the next change occurs in the spark command signal in the predetermined direction.

That is, as soon as the knocking determination signal is received by the device, control of retarding the spark timing is effected, thereby obtaining a spark retard angle proper to prevent the knocking, depending upon the frequency and therefore strength of the knocking, without delay and with excellent control response.

The device according to the present invention may further include: means for sensing a signal of frequency components substantially corresponding to knocking; rectifying means for rectifying the signal; smoothing means for smoothing the rectified signal; second comparator means for comparing the signal of frequency components substantially corresponding to knocking with the smoothed signal to output a comparison output when the former signal exceeds the latter signal in amplitude; integrating means to integrating the comparision output with respect to time; first reset means for resetting the second integrating means each time the spark command signal is inputted thereto; and third comparator means for comparing the output of said second integrating means with a reference level to produce the knocking determination signal when the former exceeds the latter in amplitude.

BRIEF DESCRIPTION OF THE DRAWINGS

Other features and advantages of the present invention will be apparent from the following description taken in conjunction with the accompanying drawings, which are not intended to be limitative and which are given as an example only. In the drawings.

DETAILED DESCRIPTION OF THE PREFERRED EMBODIMENTS

Figure 1:
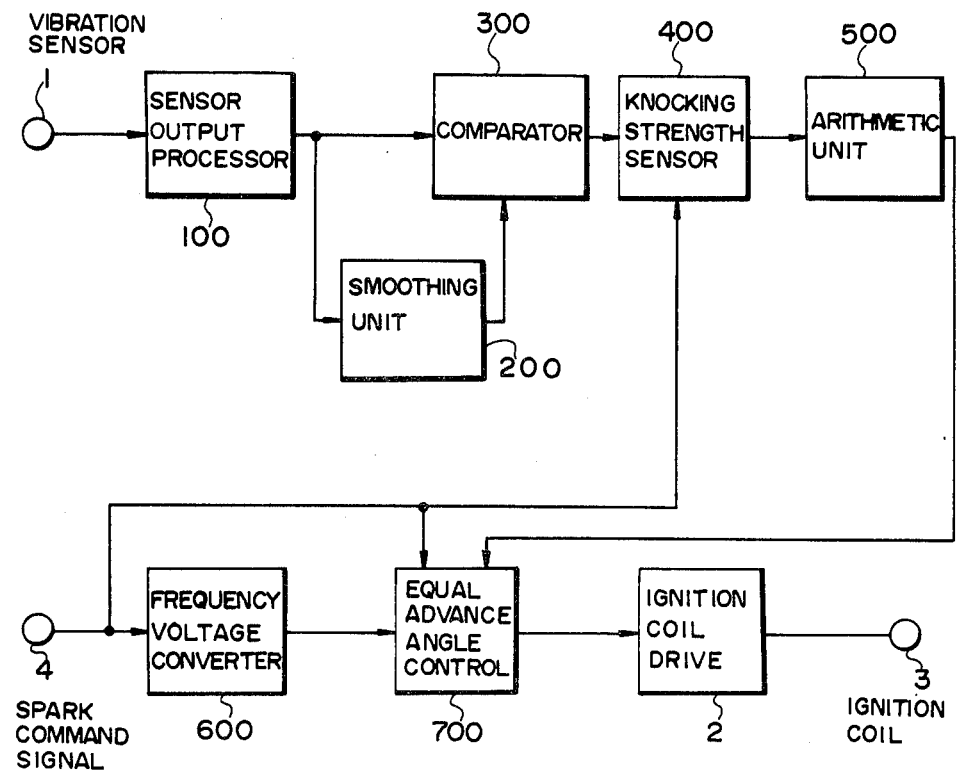
FIG. 1 is a block diagram of one preferred embodiment of a spark timing control device according to the present invention.

The same reference numeral denotes corresponding elements or parts of the embodiment and modifications of the invention throughout the drawings.

In FIG. 1, one preferred embodiment of the spark timing control device according to the present invention includes a vibration sensor 1, a sensor output processor unit 100, a smoothing unit 200, a comparator unit 300, and a knocking strength sensor unit 400. The spark timing control device further includes an arithmetic unit 500, a frequency/voltage converter unit 600, and an equal advance angle control unit 700, and receives a knocking determination signal from the knocking strength sensor unit 400 and outputs an adjusted spark timing signal through a spark coil drive 2 to an ignition coil 3.

An input 4 receives a spark command or reference signal, for example from a breaker point of a distributor, not shown, which is driven by the engine.

The vibration sensor 1 may be of a resonant type which includes a thin plate-like piezoelectric element, two silver coating electrodes formed on the opposite surfaces of the piezoelectric element, a metal disc attached to one of the outer end faces of the coating electrodes by an electrically conductive adhesive, and a case support mounted on the automotive vehicle and to which the metal disc is secured at its center. Thus vibrations of the metal disc caused by the engine vibrations are converted by the piezoelectric element to electric signals. The resonant frequency of the metal disc is set to be in the range of the knocking frequencies of the engine (for example, 6.5 KHz to 8.5 KHz) and a vibration component having the resonant frequency is amplified and extracted. Alternatively, the vibration sensor may be of another type resonant vibration sensor which senses sounds due to the pressure and the combustion within the combustion chamber of the engine, and which selects a frequency corresponding to the knocking and converts it to an electrical signal.

The electrical signal indicating the vibration frequencies substantially corresponding to knocking, thus obtained, still contains relatively low frequency components which serve as interference frequencies. These relatively low frequency components are removed in the sensor output processor 100. The signal from which the interference frequencies have been removed is amplified and rectified in the sensor output processor 100. In this particular embodiment, this rectification of the signal is shown as half wave rectification. However, full-wave rectification of the signal may also of course be used. The vibration sensor 1 may convert all frequencies to corresponding electrical signals, and a band pass filter, not shown, may receive all these frequencies and output frequencies substantially corresponding to the knocking.

The smoothing unit 200 smoothes the rectified signal and outputs a smoothed level output. This output is inputted to the comparator 300 along with the signal from the sensor output processor 100 for comparing purposes. The knocking strength sensor unit 400 integrates the output from the comparator unit 300 with respect to time, and compares this integrated value with a reference level once every predetermined crank angle interval, for example for each spark period. When the integrated value exceeds the reference level, the knocking strength sensor unit 400 determines that there is knocking and outputs a signal representing it.

The knocking determination signal triggers the arithmetic unit 500. This unit 500 calculates a signal to retard the spark timing by a given angle each time a trigger signal is inputted thereto, and to advance the spark timing toward the normal spark time point, when a trigger signal is not inputted, by an angle which changes according to a predetermined function.

The frequency/voltage converter unit 600 converts a spark command signal, corresponding to the rotational speed of the engine, from the input 4, to a corresponding voltage signal. This voltage signal, the signal from the arithmetic unit 500, and the spark command signal from the input unit 4 are inputted to the equal advance angle control unit 700 which retards the spark timing according to the respective input signals and which outputs an adjusted spark timing signal through the ignition coil drive 2 to the ignition coil 3 thereby retarding the spark timing by a certain angle from the normal spark timing point.

The various units of the device according to the present invention will now be described in more detail.

SENSOR OUTPUT PROCESSOR 100

Figure 2:
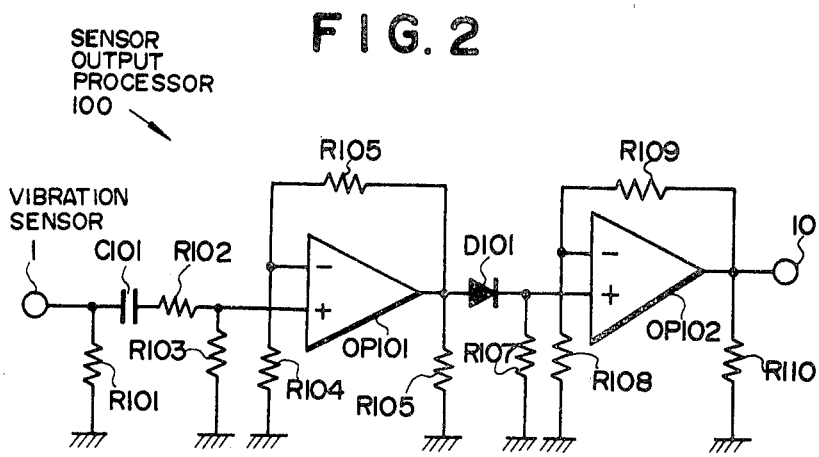
FIG. 2 is a circuit diagram of the sensor output processor unit of the device.
Figure 6:
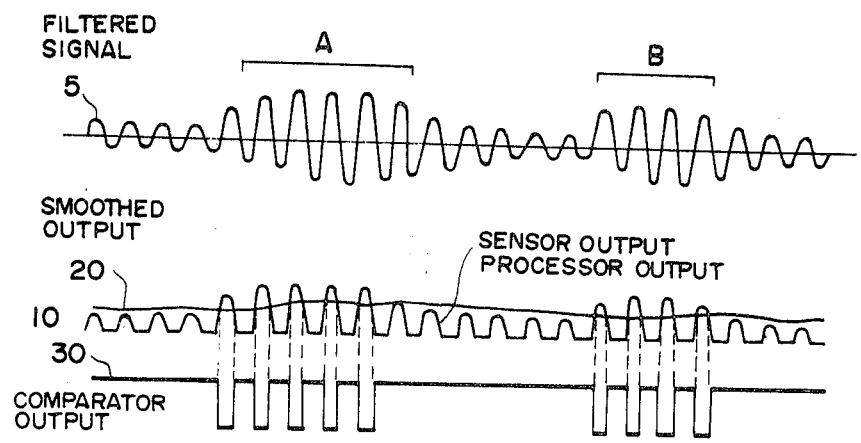
FIG. 6 is a waveform chart related to the smoothing and comparator units of the device.

In FIG. 2, the details of the sensor output processor unit 100 are shown. A filter circuit which includes resistors R 101, R 102, R 103 and a capacitor c 101 removes low frequency components which constitute noise, from an electrical signal of frequency components substantially corresponding to knocking. An example of the filtered electrical signal 5 of for example 6.5 to 8.5 KHz, is shown in FIG. 6, where relatively large amplitudes suggest knocking at times A and B.

However, the signal from the sensor 1 also contains vibration components occurring at a steady state due to the combustion within the engine. These vibration components change greatly in amplitude according to the operating condition (the rotational speed, the load state, etc.) of the engine. Thus it is not sufficient to compare the signal 5 with a fixed reference level and determine the vibration components exceeding the reference level as produced by knocking. This is because the vibration components exceeding the reference level may be due to the operating condition of the engine. Consequently, the reference level with which the signal 5 is compared must be changed according to the operating condition of the engine. To this end, the knocking vibration components of the signal 5 will be sensed as follows.

After passing through the filter circuit, the signal is amplified in an operational amplifier OP 101 connected to resistors R 104, R 105 and R 106, is rectified in a half-wave rectifier including a diode D 101 and a resistor R 107, and amplified as predetermined in an operational amplifier OP 102 connected to resistors R 108, R 109 and R 110. The operational amplifiers OP 101 and OP 102 each receive the signals at their plus input terminals and therefore a waveform which is obtained by half wave rectification of the signal 5, designated by reference numeral 10 in FIG. 6, is outputted to a terminal which is denoted by the same reference numeral 10.

SMOOTHING UNIT 200

Figure 3:
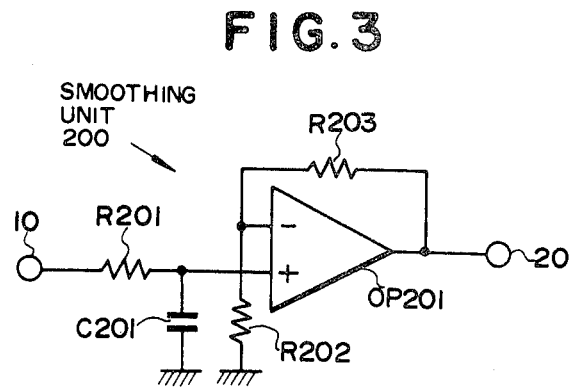
FIG. 3 is a circuit diagram of the smoothing unit of the device.

FIG. 3 illustrates the structure of the smoothing unit 200.

The signal waveform from the terminal 10 is smoothed by a smoothing circuit consisting of a resistor R 201 and a capacitor C 201. The smoothed output from the smoothing circuit is amplified to a predetermined level by an operational amplifier OP 201 connected to resistors R 202 and R 203 and is outputted at a smoothed level denoted by reference numeral 20 in FIG. 6 from an output terminal designated by the same reference numeral 20.

COMPARATOR UNIT 300

Figure 4:
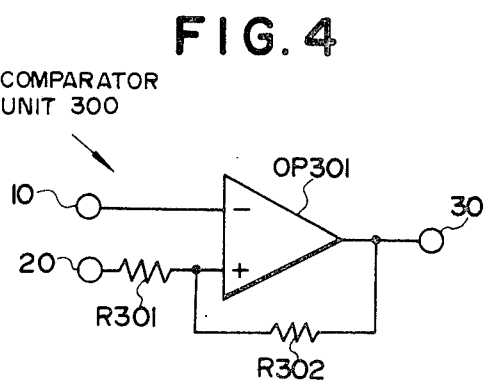
FIG. 4 is a circuit diagram of the comparator unit of the device.

In FIG. 4, the details of the comparator unit 300 are shown. This compares the signals from the terminals 10 and 20. An operational amplifier OP 301 connected to a resistor R 302 receives the smoothed level at its plus input terminal through a resistor R 301 from the terminal 20 and the signal at its minus input terminal from the terminal 10. Thus the operational amplifier OP 301 compares both these signals and outputs a pulse signal 30 shown in FIG. 6 from an terminal designated by the same reference numeral 30. This pulse signal output is normally high and goes low when the signal from the terminal 10 exceeds the smoothed level from the terminal 20. If the negative-going pulses of the pulse signal output from the terminal 30 should all be determined as knocking, it may be a mistaken determination because the signal from the vibration sensor 1 contains various apparent knocking vibrations, such as ignition noises. Thus in the particular embodiment, the integrated value of the negative-going pulse and a reference level are compared for each predetermined crank angle width such as, for example one spark period, in order to output a knocking determination signal.

KNOCKING STRENGTH SENSOR UNIT 400

Figure 5:
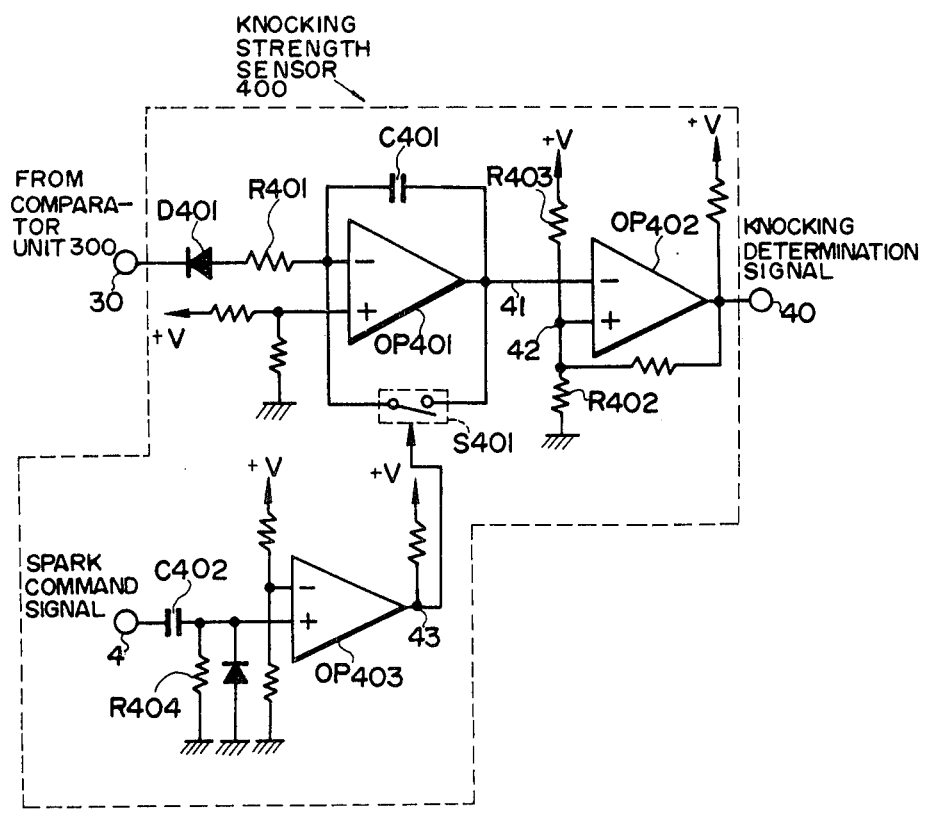
FIG. 5 is a circuit diagram of the knocking strength sensor unit of the device.
Figure 7:
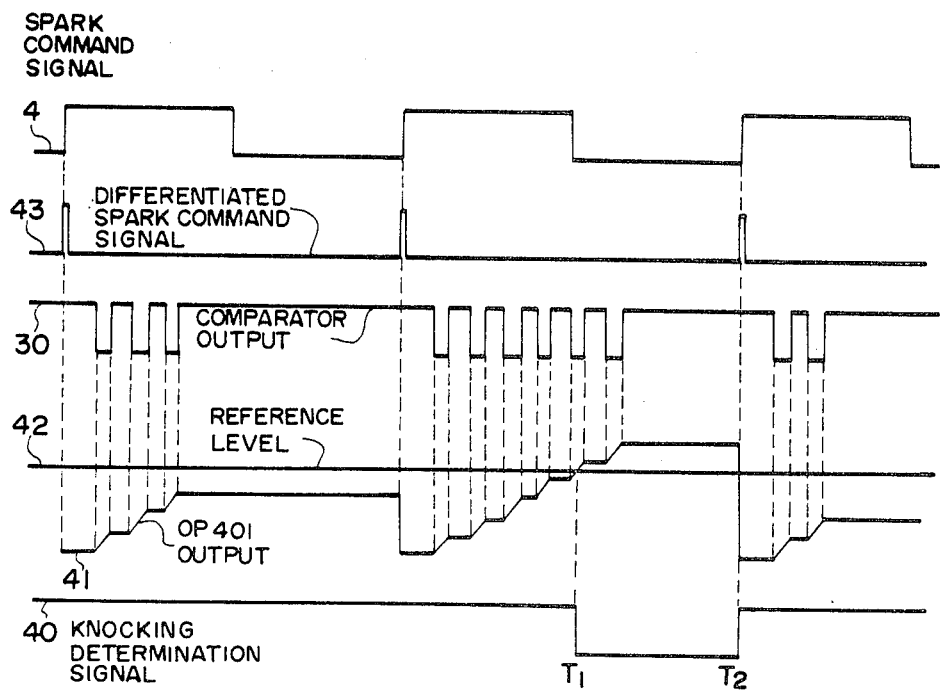
FIG. 7 is a waveform chart related to the knocking strength sensor unit.

In FIG. 5, the knocking strength sensor unit 400 is shown. The pulse signal produced at the terminal 30 and for example shown by the same reference numeral 30 in FIG. 7 is inputted through a diode D 401 and a resistor R 401 to an inverting terminal of an integrating circuit which includes a resistor R 401, a capacitor C 401 and an operational amplifier OP 401 whose noninverting terminal is supplied with a fixed potential level. If a relay switch S 401 is open, the negative-going pulses of the above pulse signal will be integrated with respect to time and the integrated value will be outputted from a terminal 41, the output waveform being step-like and designated by the same reference numeral 41 in FIG. 7. On the other hand, a spark command signal, which is designated by reference numeral 4 in FIG. 7 is outputted from a terminal designated by the same reference numeral 4. This signal is differentiated in a differentiator consisting of a capacitor C 402 and a resistor R 404 with respect to time, and is amplified in an amplifier OP 403. Thus the differentiated signal 43 in FIG. 7, that is, a signal having a positive-going pulse of a fixed width each time the spark command signal 4 rises, is produced at a terminal which is designated by the same reference numeral 43. This signal closes a relay switch S 401 each time a positive-going pulse is output, i.e each time a spark command signal is supplied to the terminal 4, at which time the capacitor C 401 is short-circuited thereby resetting the integrator. Therefore the signal which is output at the terminal 41 returns instantaneously to a predetermined level, as shown by the same reference numeral 41 in FIG. 7, each time a differentiated spark command signal 43 is outputted to the switch S 401, and forms a step-like waveform which is obtained by integrating negative-going pulses of the pulse signal 30 for each spark period. This step-like signal 41 is inputted to a minus input terminal of a comparator OP 402 and is compared with a signal supplied to a plus input terminal of the comparator OP 402 from the terminal 42. This signal is a fixed voltage level provided by dividing resistors R 402 and R 403, and is used as a reference signal designated by the same reference numeral 42 in FIG. 7. The comparator OP 402 outputs a signal of relatively low level 40 in FIG. 7 from a terminal designated by the same reference numeral 40 while the signal 41 exceeds the reference signal 42, i.e. during the time $T_1$ to $T_2$ in FIG. 7.

In the particular embodiment, although the reference signal 42 is shown as being at a fixed level, it may be changed so as to meet the operational state of the engine if the resistors R 402 and R 403 are changed depending on the engine operational state.

Thus while the signal 40 is low, the device determines that the engine is in the knocking condition; when this determination is to be made, the device integrates, with respect to time for each spark period, the pulse signal 30 obtained by comparing the half-wave rectified signal 10 with the reference level 20 and determines that knocking is occurring when the integrated value exceeds the reference level. Thus a mere comparison between the half-wave rectified signal 10 and the reference level 20 enables simultaneous measurement of the number and magnitude of portions of the half-wave rectified signal 10 exceeding the reference level 20, thereby detecting knocking reliably using a simple structure without malfunctions caused by noises.

Figure 8:
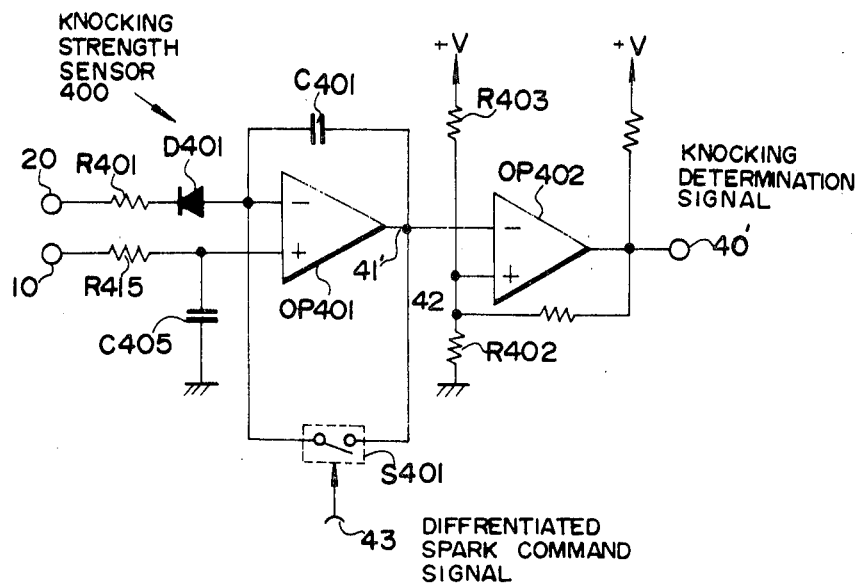
FIG. 8 is a modification of the knocking strength sensor unit.
Figure 9:
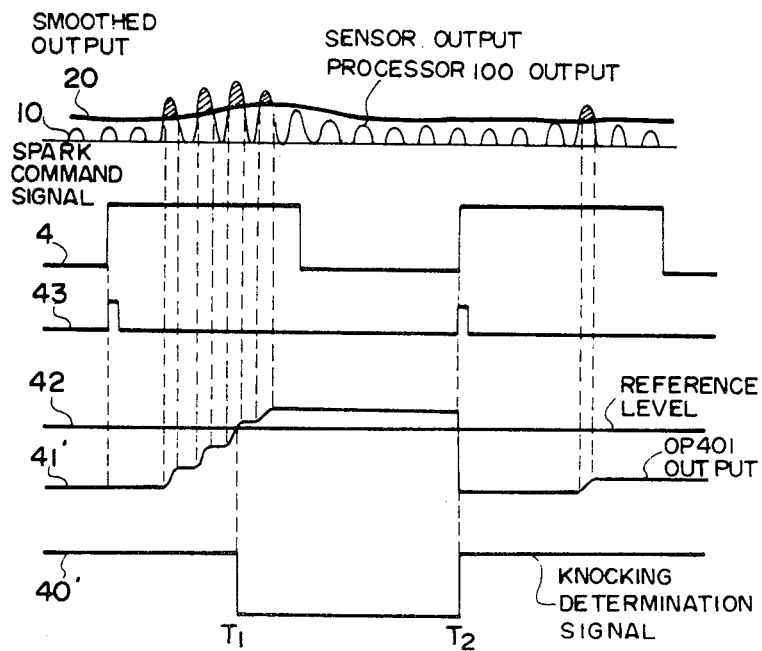
FIG. 9 is a waveform chart related to the modification of FIG. 8.

A part of the knocking strength sensor unit 400 may be constructed as shown in FIG. 8 instead of the structure shown in FIG. 5. In this alternative embodiment, the smoothed level 20 is inputted to the minus input terminal of the operational amplifier OP 401 through a resistor R 401 and a diode D 401, whereas the half-wave rectified signal 10 is inputted to the plus terminal of the integrator OP 401 through a resistor R 415 and capacitor C 405 circuit. Thus while the relay switch S 401 is open, the integrator which includes an operational amplifier OP 401 integrates those portions of the half-wave rectified signal 10 exceeding the smoothed level 20, shown hatched in FIG. 9. As described above, this embodiment is similar to the FIG. 5 embodiment in that the pulse 43 prepared by differentiating the spark command signal is inputted from the terminal 43 to close the switch S 401, at which time the integrator is reset, thereby clearing the integrated result. Thus the integrator repeatedly integrates area portions of the half-wave rectified signal 10 exceeding the smoothed level 20, shown hatched in FIG. 9, and outputs a signal 41' shown in FIG. 9 from the terminal designated by the same reference numeral 41' for a time duration $T_1$ to $T_2$ when the signal 41' exceeds the reference level.

This strength sensor unit 400 is characterized in that, since the area portions of the half-wave rectified signal 10 exceeding the smoothed level 20 are integrated with respect to time, a mere comparison between these signals enables simultaneous determination of the number and magnitude of the area portions of the half-wave rectified signal 10 thereby determining the strength of knocking more precisely than in the previous embodiment. Further, this device eliminates the need to create a pulse signal such as shown by 30 in FIG. 6, thereby simplifying the device structure.

Figure 10:
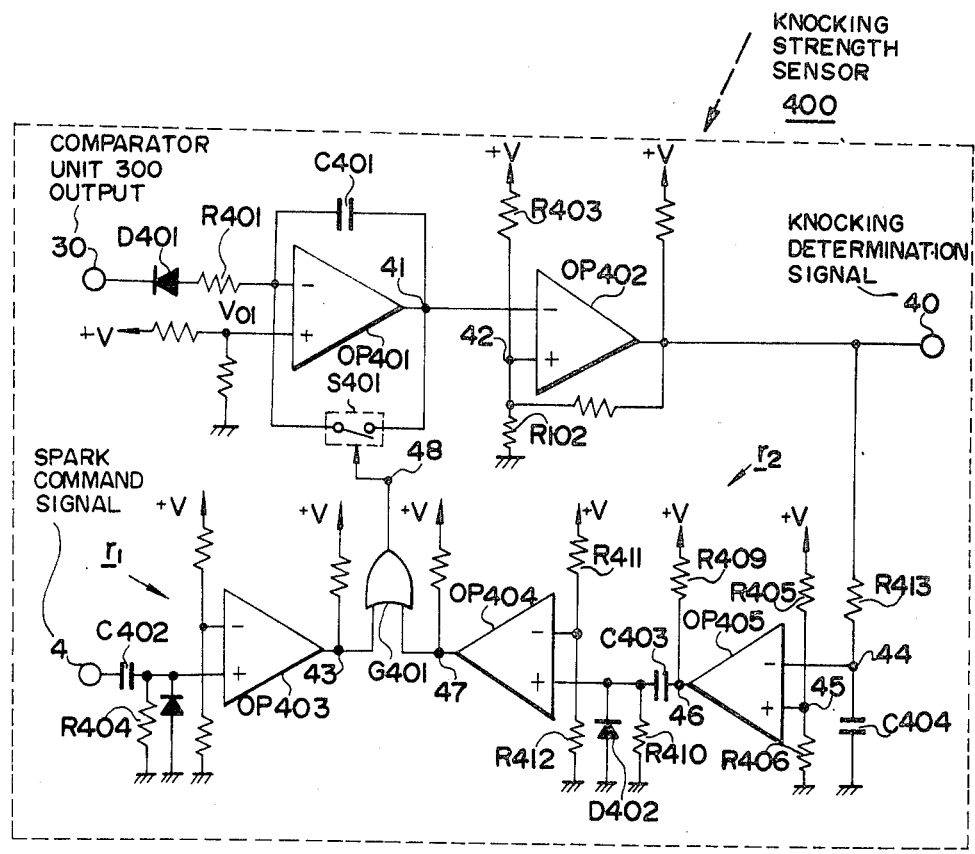
FIG. 10 is a second modification of the knocking strength sensor unit.

In FIG. 10, a modification of the knocking strength sensor unit 400 is shown.

The integrating circuit including the operational amplifier OP 401 is reset by a reset circuit $r_1$ once every predetermined crank angle revolution, for example for each spark period, in order to check whether knocking is occuring. Further, the integrating circuit is reset by the reset circuit $r_2$ each time a knocking determination signal is outputted from terminal 40 in order that the knocking determination signal is output at a frequency corresponding to the strength of the knocking, thereby improving the knocking sensor unit.

This knocking determination signal is inputted to the reset circuit $r_2$ and the arithmetic unit 500.

Figure 11:
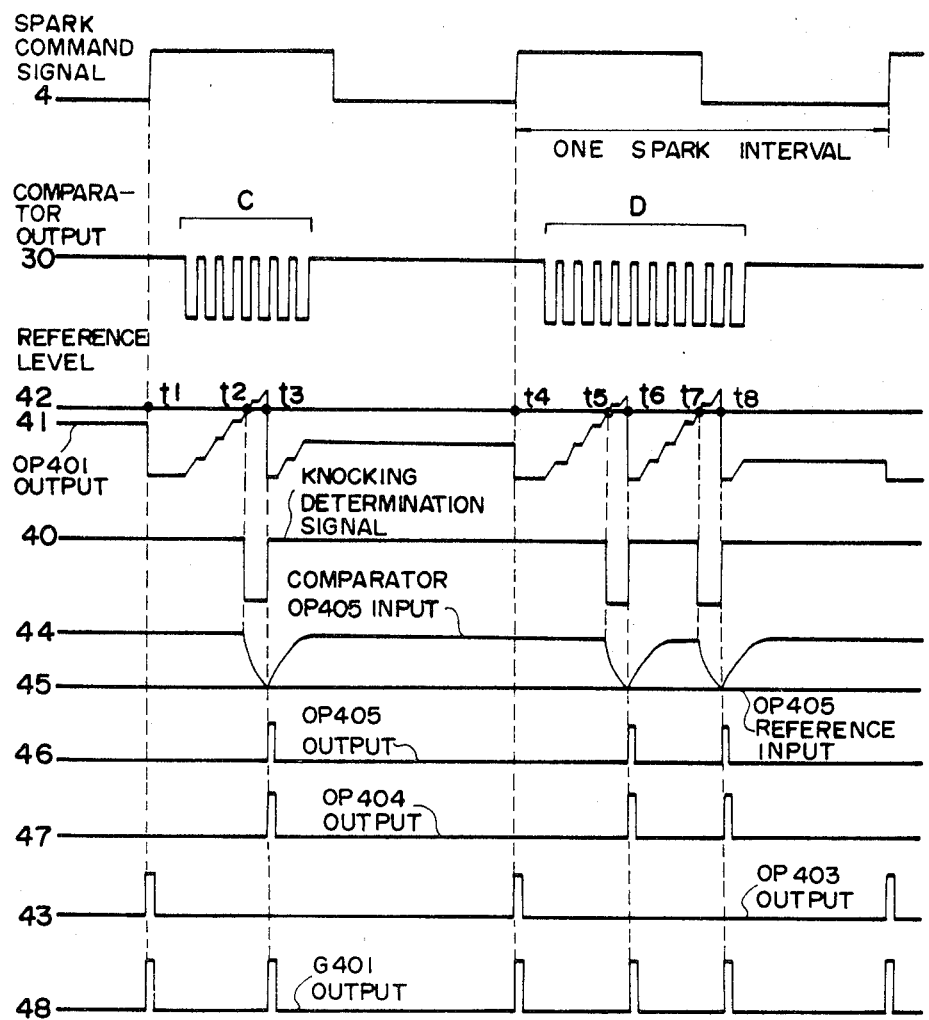
FIG. 11 is waveform charts related to the second modification of FIG. 10.

In the reset circuit $r_2$, the knocking determination signal is inputted to a delay circuit, which includes a resistor R 413 and a capacitor C 404, which produces a delay signal, shown by 44 in FIG. 11, from a terminal designated by the same reference numeral 44. The signal 44 is compared in a comparator OP 405 with a predetermined reference level, shown by 45 in FIG. 11, determined by dividing resistors R 405 and R 406, to produce a comparison pulse signal 46 in FIG. 11 at a terminal designated by the same reference numeral 46 and to which a power supply is applied through a resistor R 409. This comparison pulse signal is differentiated by a differentiator, which includes a capacitor C 403, a resistor R 410 and a diode D 402, with respect to time. Since this differentiated signal is compared in a comparator OP 404 with a predetermined level determined by dividing resistors R 411 and R 412, a signal 47 in FIG. 11, having a predetermined time duration, is produced at an output terminal designated by the same reference numeral 47 and to which the power supply is applied.

The operation of the above circuits will be described in more detail with respect to FIG. 11. When the spark command signal 4 rises at a time $t_1$, a reset signal 43 is produced by the reset circuit $r_1$, and closes the relay switch S 401 through a gate G 401. Thus the integrating circuit is reset, thereby starting the integrating operation. Pulses of negative polarity in the time interval C produced by knocking at the terminal 30 are integrated. A knocking determination signal 40 is produced at a time $t_2$ when the integrated value 41 exceeds the reference level 42. The knocking determination signal 40 is inputted to the arithmetic unit 500 which will be described in more detail below, and is also input to the reset circuit $r_2$ which produces the reset signal 46 at a time $t_3$ i.e. a predetermined time interval after the time $t_2$, thereby resetting the integrating circuit.

From this time $t_3$, the integrating circuit starts its integrating operation, but since the knocking strength in the duration C is relatively small, the integrated value 41 does not exceed the reference level 42 again, and the knocking determination signal 40 is not outputted again.

When the spark reference signal 4 rises again at a time $t_4$, the integrating circuit is reset in the same way as previously, and the integration of pulses of negative polarity in the interval D due to the knocking is started. Since the knocking strength in the duration D is relatively large, the integrated value exceeds the reference level 42 at a time $t_5$, and a knocking determination signal 40 is again outputted. When operation of the integration circuit is again starts at a time $t_6$, the integrated value again exceeds the reference level 42 at a time $t_7$, and again a knocking determination signal 40 is outputted. Thereafter, at a time $t_8$, the integration of the integrating circuit is again started, but in the duration D, the integrated value 41 does not exceed the reference level 42.

That is, in one spark duration containing the interval C in which the knocking strength is relatively small, one pulse of the knocking determination signal 40 is outputted, whereas, in another spark period containing the interval D in which the knocking strength is relatively large, two pulses of the knocking determination signal are outputted. That is, the knocking strength sensor unit outputs knocking determination signals the number of which corresponds to the knocking strength, for each predetermined crank angle rotation, for example one spark period. This knocking determination signal 40 is inputted to the arithmetic unit 500 as described above.

ARITHMETIC UNIT 500

Figure 12:
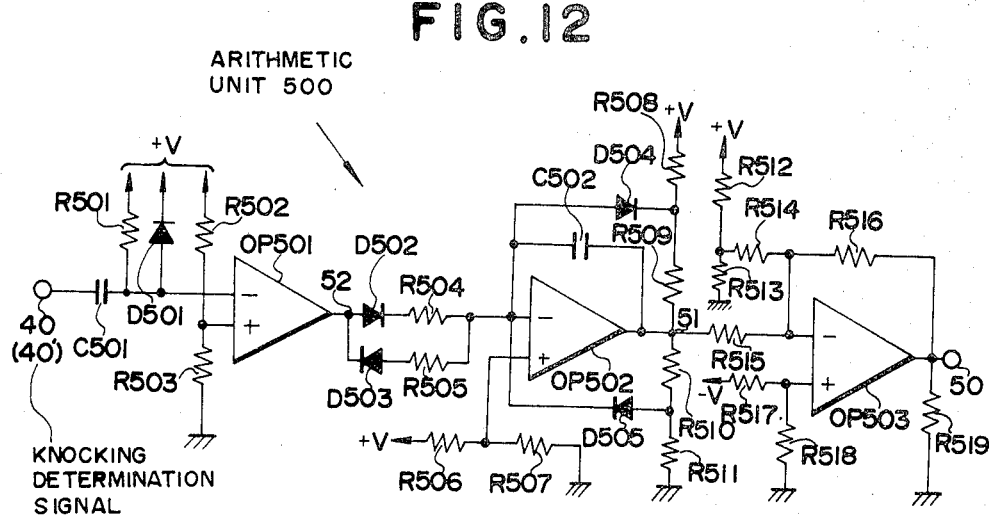
FIG. 12 is a circuit diagram of the arithmetic unit of the device.

FIG. 12 shows the arithmetic unit 500 which includes a monostable multivibrator, including an amplifier OP 501, a capacitor C 501, resistors R 501 to R 503, and a diode D 501, at its forward stage. The monostable multivibrator is triggerd when the knocking determination signal 40 (40') changes from high level to low level and outputs a signal 52 shown in FIG. 18 from a terminal designated by the same reference numeral 52. Provided after the multivibrator is an integrator constituted by an amplifier OP 502, a capacitor C 502, and resitors R 504 to R 507. This integrator is connected through two diodes D 502 and D 503, which are disposed with opposing polarities, to the terminal 52. Thus the integrator can individually set the time constants for two integrating directions; the downward time constant is determined by the resistor R 504 and the capacitor C 502, whereas the upward time constant is determined by the resistor R 505 and the capactior C 502. A limiting circuit consists of diodes D 504 and D 505, and resistors R 508 to R 511, and limits the operational range of the integrator between 0 and +V of a power supply. Thus when the above-mentioned signal 52 is applied to the integrator, this integrator outputs from a terminal 51 a signal designated by the same reference numeral 51 in FIG. 18 which rises gradually so long as the signal 52 is at a relatively low level, which is saturated at an upper value determined by resistors R 510 and R 511, and which rapidly falls when the signal 52 goes high. As will be clear from FIG. 18, if the respective time constants are selected so that the rising speed is less than the falling speed, and if high levels of the signal 52 occur very frequently, the signal 51 will fall stepwise and is saturated at a lower level defined by dividing resistors R 508 and R 509.

The time interval for which the signal 52 stays high is a fixed time duration determined by the monostable multivibrator including the amplifier OP 501. The amount of integration that the integrator carries out once in the downward direction for this high level signal is constant. This constant amount is preferably selected so as to correspond to a 0.5° spark retard angle. Since the magnitude of the output 51 of the integrator corresponds to the frequency of occurrence of high levels of the signal 52, it can be used as an adjustment value for the spark timing.

Provided at the next stage of the integrator is a polarity inversion circuit consisting of resistors R 512 to R 519 and an operational amplifier OP 503. This circuit inverts the polarity of the incoming integrator output 51 in order to match the same to the signal of the equal advance angle control unit 700, adjusts the level of the integrator output 51 and outputs an output 50 shown in FIG. 18 from a terminal designated by the same reference numeral 50.

Figure 13:
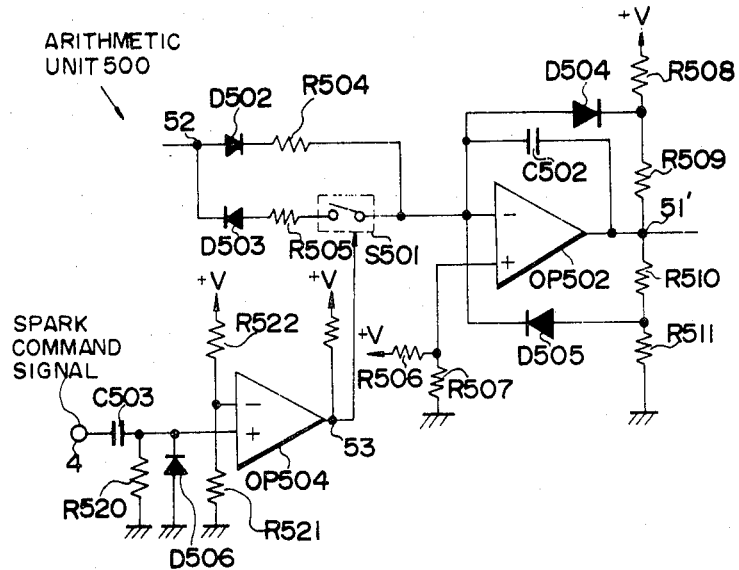
FIG. 13 is a modification of the arithmetic unit.
Figure 14:
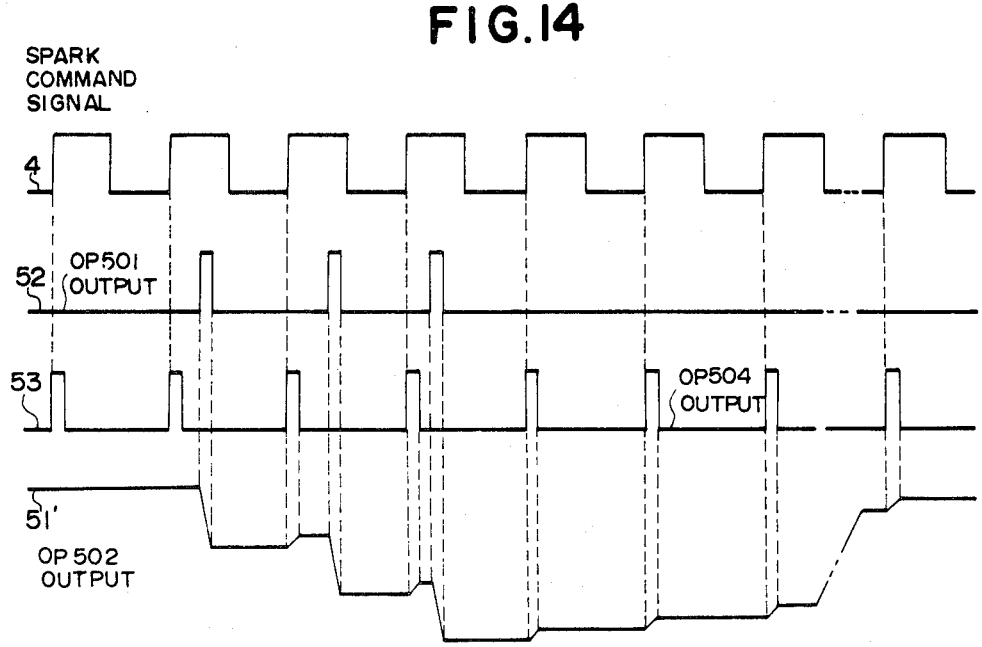
FIG. 14 is a waveform chart related to the modification of FIG. 13.

Alternatively, a part of the arithmetic section 500 may be constituted as shown in FIG. 13. In this alternative, a relay switch S 501 is disposed in the branch of the integrating circuit including a diode D 503 and a resistor R 505. The switch is opened and closed by an output signal from a differentiator which includes a capacitor C 503, resistors R 520, R 521 and R 522, a diode D 506, and an operational amplifier OP 504. This differentiator is the same type as shown in FIG. 5, and differentiates the signal 4, shown in FIG. 14, from a terminal designated by the same reference numeral 4, with respect to time, and outputs to a terminal 53 a pulse signal designated by the same reference numeral 53 in FIG. 14, i.e. a signal having a positive-going pulse of constant amplitude each time the spark command signal 4 rises. This signal 53 closes the switch S 501 each time the positive-going pulse is produced, i.e. each time a spark command signal 4 is received. Thus the circiuit including the diode D 503 and resistor R 505 integrates the positive-going pulse with respect to time in the ascending direction by the time interval corresponding to the width of the positive-going pulse 53, and holds the integrated value by opening the switch S 501 in the absence of positive-going pulses. On the other hand, the integration of the signal 52 shown in FIG. 14 inputted from the terminal 52, by the circuit which includes a diode D 502 and a resistor R 504, is performed in the descending direction, for a time interval corresponding to the width of the positive-going pulse of the signal 52. Thus a signal waveform 51' in FIG. 14 is outputted to a terminal designated by the same reference numeral 51'. This waveform 51' is processed in the same way as mentioned above in order to obtain an adjusted spark timing signal.

FREQUENCY/VOLTAGE CONVERTER UNIT 600

Figure 15:
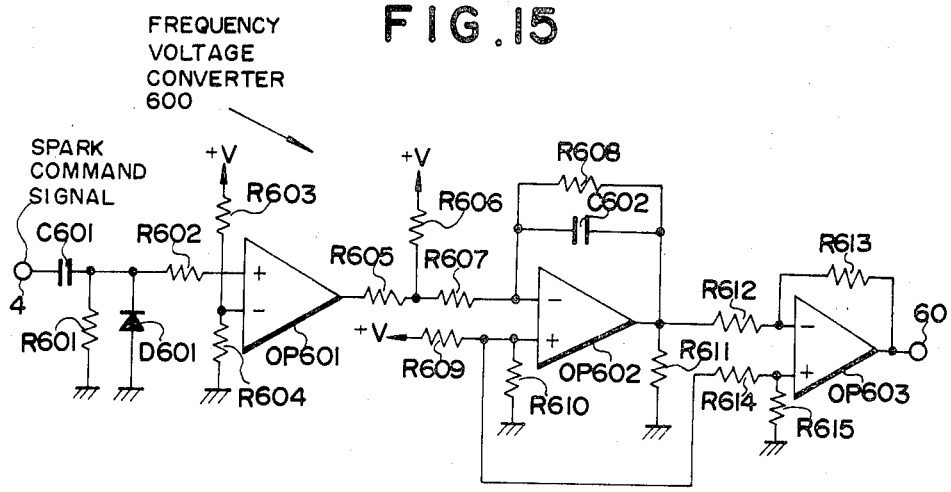
FIG. 15 is a circuit diagram of a frequency/voltage converter unit of the device.

FIG. 15 shows a frequency/voltage converter unit 600 which converts the rotational speed of the crankshaft to a corresponding voltage. A monostable multivibrator, formed by a capacitor C 601, resistors R 601 to R 604, a diode D 601, and an operational amplifier OP 601, converts the spark command signal 4 to a pulse signal having a fixed width. This pulse signal is converted to a corresponding analog voltage by a smoothing circuit consisting of resistors R 605 to R 615, a capacitor C 602 and operational amplifiers OP 602 and OP 603, and is output from a terminal 60. This analog voltage corresponds to the rotational speed of the crankshaft.

EQUAL ADVANCE ANGLE CONTROL UNIT 700

Figure 16:
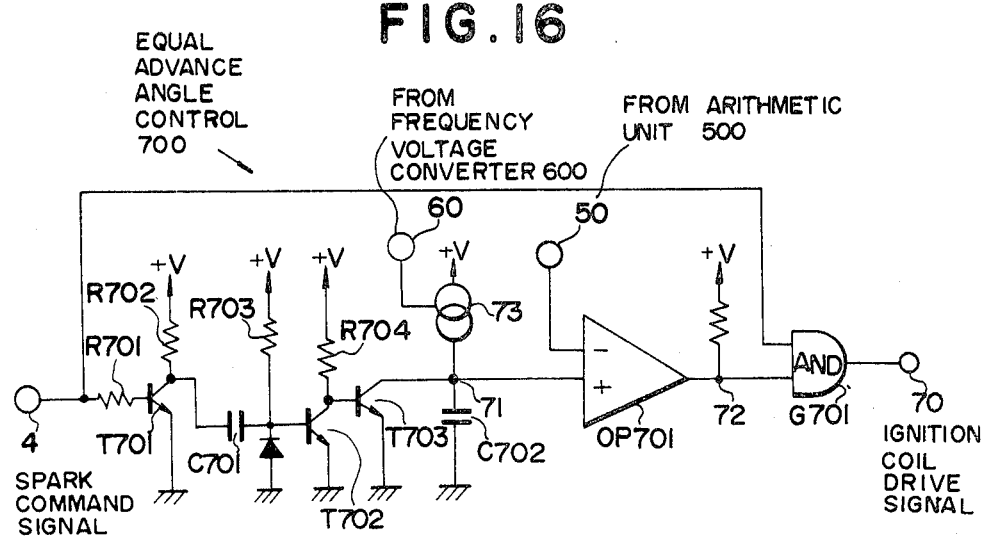
FIG. 16 is a circuit diagram of an equal advance angle control unit of the device.
Figure 18:
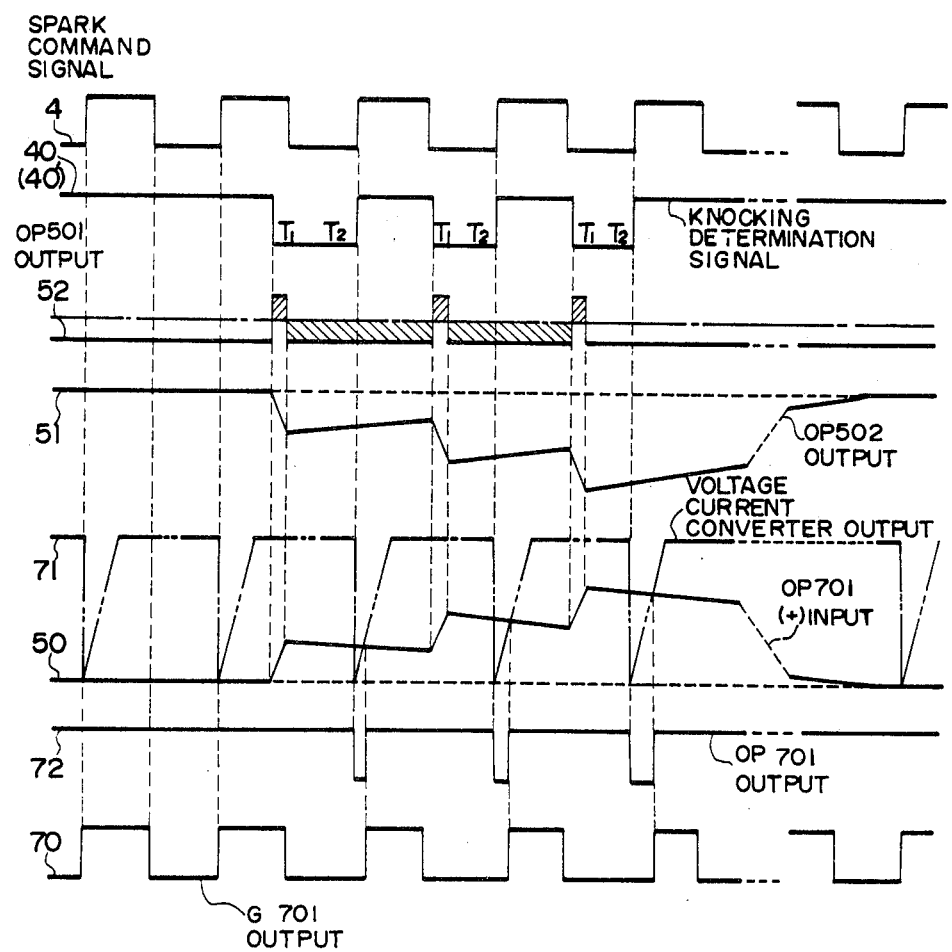
FIG. 18 is a waveform chart related to the equal advance angle control unit.
Figure 19A:
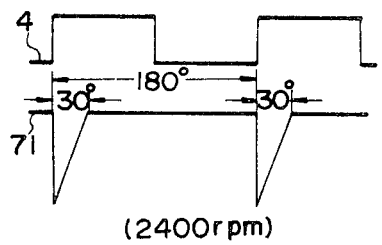
FIGS. 19(a) and (b) is a chart illustrating the phase relationship between the an equal advance angle integrated waveform and a spark command signal.
Figure 19B:
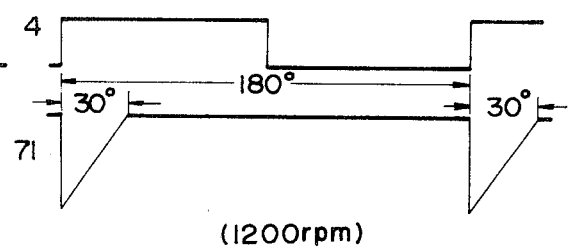

In FIG. 16, the equal advance angle control unit 700 includes a differential circuit consisting of transistors T 701 to T 703, resistors R 701 to R 704, and a capacitor C 701. This differentiating circuit differentitates the spark command signal 4 with respect to time, renders the transistor T 703 conductive at each rise of the spark command signal 4, and short-circuits the capacitor C 702 for resetting purposes. Immediately after this resetting, the transistor T 703 is rendered nonconductive, with the result that the capacitor C 702 is charged with an electric current converted from the analog voltage from the terminal 60 proportional to the rotational speed of crankshaft through a voltage/current converter 73. Thus the voltage 71 shown in FIG. 18 appears at the terminal designated by the same reference numeral 71. Since the magnitude of the charging current to the capacitor C 702 is proportional to the rotational speed of the crankshaft, as described above, the voltage waveform 71 converted to a crank angle is constant irrespective of the rotational speed of the crankshaft, and appears as an equal advance angle integrated waveform, as will be clear from the comparison between FIGS. 19(a) and 19(b) showing rotational speeds of the crankshaft of 2400 rpm and 1200 rpm.

Figure 17:
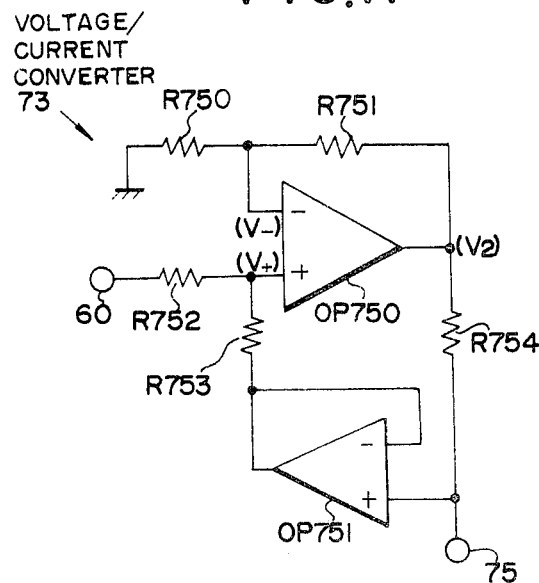
FIG. 17 is a circuit diagram of a voltage/current converter circuit of the equal advance angle control unit.

The voltage/current converter 73 has the structure shown in FIG. 17 by which the voltage 60 proportional to the rotational speed of the crankshaft is supplied through a resistor R 752 to a plus input terminal of a differential amplifier OP 750. Now, for the convenience of description, let us designate the value of the voltage 60 by $V_{60}$, the output voltage at the terminal 75 by $V_{75}$, the voltage at the plus input terminal of the differential amplifier OP 750 by $V_+$, the voltage at the minus input terminal of the differential amplifier by $V_-$, and the voltage at the output terminal by $V_2$. If the resistors R 750 to R 753 are of the same resistance value, the voltage $V_+$ is $(V_{60}+V_{75})/2$, because of the feedback circuit including the differential amplifier OP 751 and resistor R 753, and the voltage $V_-$ is $V_2/2$. The differential amplifier OP 750 operates such that the output $V_2$ thereof becomes $V_{60}+V_{75}$ under the presence of the feedback circuit. Thus the voltage across the resistor R 754 is $V_{60}+V_{75}-V_{75}=V_{60}$. The electric current flowing through this resistor R 754, i.e. the output current from the terminal 75 is $V_{60}/R$ 754 which is always proportional to the input voltage 60 which in turn is proportional to the rotational speed of the crankshaft. Accordingly, the output current from the terminal 75 is controlled by the input voltage 60 while being always proportional to the speed of the engine or crankshaft. The charging speed of the capacitor C 702 is determined by the speed of the automotive vehicle or crankshaft and takes the equal advance angle integration wave 71.

This waveform 71 from the terminal 71 is inputted to a plus input terminal of an operational amplifier OP 701 to a minus input terminal of which is inputted the signal 50. The operational amplifier OP 701 outputs a retard angle signal of negative-going pulses whose pulse widths represent the intervals when the signal 71 is at a lower level than the signal 50, the retard angle signal 72 being shown in FIG. 18, and the reference numeral 72 being also used to designate the terminal from which the signal 72 is outputted. If it is arranged that the signal advance integration waveform 71 is saturated at a crank angle of 30°, as shown in FIG. 18, the width of the negative-going pulse of the retard angle signal 72 will not exceed a crank angle of 30°. Alternatively, it may be arranged that the retard angle of spark timing is never allowed to exceed 30° even if erroneous operation takes place, thereby preventing stalling of the engine.

The retard angle signal 72 and the spark command signal 4 are inputted to an AND gate G 701 which outputs an adjusted spark timing signal 70 shown in FIG. 18, from the terminal designated by the same reference numeral 70, defined by the logical product of both input signals. This adjusted spark timing signal is fed to the ignition coil 3 through the ignition coil drive 2 shown in FIG. 1, thereby causing sparks at respective adjusted time points, end suppressing the occurrence of knocking.

While only certain embodiments and modifications of the invention have been shown and described it is apparent that other modifications, changes and alternations may be made without departing from the true scope and spirit thereof.

What is claimed is:

1. A spark timing control device for an internal combustion engine, comprising:

means for providing a knocking determination signal indicative of the occurrence of engine knock at a frequency higher than a predetermined frequency and an amplitude greater than a predetermined amplitude, producing means connected to receive said knocking determination signal as an input for producing an output which changes at a certain rate by an amount corresponding to a predetermined crank angle in the direction of retarding a spark timing each time said knocking determination signal is inputted thereto indicating the occurrence of knocking at a frequency higher than a predetermined frequency and an amplitude greater than a predetermined amplitude, and which changes at a smaller rate than said certain rate in the direction of advancing the spark timing in the absence of the knocking determination signal;

means for providing a spark command signal;

outputting means connected to receive said spark command signal as an input for outputting a signal which is reset to a base value each time said spark command signal is inputted thereto and which thereafter changes to a predetermined level at a rate depending upon the rotational speed of the engine;

first comparator means for comparing the outputs of the producing means and the outputting means to output a pulse signal of a duration corresponding to the interval when the output of the producing means is greater than the output of the outputting means; and retarding means for retarding the spark timing by an amount corresponding to the duration of the pulse signal.

2. The device according to claim 1, wherein said producing means outputs a signal which, in the absence of the knocking determination signal, changes by an amount corresponding to a predetermined crank angle in the direction of advancing the spark timing each time the spark command signal changes in a predetermined direction, and then holds the final value of the signal output from the producing means until the next change occurs in the spark command signal in the predetermined direction.

3. The device according to claim 1, wherein said producing means includes pulse generating means outputting a pulse when the knocking determination signal changes in a predetermination direction, and first integrating means for integrating the pulse with respect to time.

4. The device according to claim 3, wherein said first integrating means includes an operational amplifier having an inverting input terminal and a noninverting input terminal, a capacitor connecting the output terminal and the inverting input terminal of the amplifier and a parallel circuit for receiving the pulse from the pulse generating means, said parallel circuit including one branch which includes a series connected diode and resistor circuit and the other branch which includes a second series connected diode and resistor circuit, said two resistors being different in resistance and said two diodes being arranged with opposing polarities.

5. The device according to claim 4, further including switching means interposed in one branch of said parallel circuit and control means for turning on said switching means for a certain time interval only from when the spark command signal changes in a predetermined direction.

6. The device according to claim 3, wherein said pulse generating means includes a monostable multivibrator.

7. The device according to any of claims 1 to 6, wherein said producing means includes inverting means for inverting the polarity of the output of said integrating means.

8. The device according to any of claims 1 to 6, wherein said outputting means includes converting means for converting the spark command signal to an electric current, a capacitor charged by this current, the potential of the capacitor being the output of said outputting means, and short-circuitting means for short-circuitting the capacitor each time the spark command signal is input thereto.

9. The device according to claim 8, wherein said converting means includes a first converter for converting the frequency of the spark command signal to a voltage signal, and a second converter for converting the voltage signal from said first converter to the electric current.

10. The device according to any of claims 1 to 6, wherein said retarding means is an AND gate to which the output of said first comparator means and the spark command signal are inputted.

11. The device according to any of claims 1 to 6, wherein said knocking determination signal providing means includes:
sensing means for sensing a signal of frequency components substantially corresponding to knocking;
rectifying means for rectifying the signal;
smoothing means for smoothing the rectified signal;
second comparator means for comparing the signal of frequency components substantially corresponding to knocking with the smoothed signal to output a comparison output when the former signal exceeds the latter signal in amplitude;
second integrating means for integrating the comparison output with respect to time;
first reset means for resetting the second integrating means each time the spark command signal is input thereto; and
third comparator means for comparing the output of said integrating means with a reference level to produce the knocking determination signal when the former exceeds the latter.

12. The device according to claim 11, further including second reset means for resetting the second integrating means for responding to the output of the third comparator means.

13. The device according to claim 12, wherein said second resetting means includes a delay circuit, fourth comparator means for comparing the output of said third comparator means with a reference level, first differentiating means for differentiating the output of the fourth comparator means with respect to time, and fifth comparator means for comparing the output of the first differentiating means with a reference level to produce an output to reset said second integrating means.

14. The device according to any of claims 1 to 6, and further wherein said knocking determination signal providing means includes;
sensing means for sensing a signal of frequency components substantially corresponding to knocking;
rectifying means for rectifying said signal of frequency components;
smoothing means for smoothing the rectified signal of frequency components;
differential integrating means for producing and integrating the difference between the magnitude of the signal of frequency components substantially corresponding to knocking and the magnitude of the smoothed signal;
reset means for receiving said spark command signal and resetting the differential integrating means each time the spark command signal is inputted thereto; and
comparator means for comparing the output of said differential integrating means with a reference level to output the knocking determination signal when the former exceeds the latter in amplitude.

15. A device for sensing knocking occurring in an internal combustion engine, comprising:
sensing means for sensing a signal of frequency components substantially corresponding to knocking;
rectifying means for rectifying said signal;
smoothing means for smoothing the rectified signal;
first comparator means for comparing the signal of frequency components substantially corresponding to knocking with the smoothed signal to output a comparison output when the former signal exceeds the latter signal in amplitude;
integrating means for integrating the first comparator output with reference to time;
first reset means for resetting the integrating means each time the spark command signal is inputted thereto; and
second comparator means for comparing the output of said integrating means with a reference level to produce the knocking determination signal when the former exceeds the latter in amplitude.

16. The device according to claim 15, further including second reset means for resetting the integrating means by responding to the output of the second comparator means.

17. The device according to claim 16, wherein the second reset means includes a delay circuit, a third comparator means for comparing the output of the second comparator means with a reference level, means for differentiating the output of the third comparator means with respect to time, and fourth comparator means for comparing the output of the differentiating means with a reference level to produce a an output to reset said integrating means.

18. A device for sensing knocking occurring in an internal combustion engine, comprising:
means for sensing a signal of frequency components substantially corresponding to knocking;
means for rectifying the signal;
means for smoothing the rectified signal;
means for producing and integrating the difference between the magnitude of the signal of frequency components substantially corresponding to knocking and the magnitude of the smoothed signal;
means for comparing the output of said integrating means with a second reference level to output the knocking determination signal when the former exceeds the latter in amplitude.

* * * * *